US009555670B2

(12) United States Patent
Himuro et al.

(10) Patent No.: US 9,555,670 B2
(45) Date of Patent: Jan. 31, 2017

(54) PNEUMATIC TIRE

(71) Applicant: BRIDGESTONE CORPORATION, Chuo-ku, Tokyo (JP)

(72) Inventors: Yasuo Himuro, Tachikawa (JP); Atsushi Miyasaka, Musashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 318 days.

(21) Appl. No.: 14/351,658

(22) PCT Filed: Oct. 22, 2012

(86) PCT No.: PCT/JP2012/077813
§ 371 (c)(1),
(2) Date: Apr. 14, 2014

(87) PCT Pub. No.: WO2013/058412
PCT Pub. Date: Apr. 25, 2013

(65) Prior Publication Data
US 2014/0332135 A1 Nov. 13, 2014

(30) Foreign Application Priority Data
Oct. 21, 2011 (JP) .................................. 2011-232088

(51) Int. Cl.
*B60C 13/00* (2006.01)
*B60C 13/04* (2006.01)
(52) U.S. Cl.
CPC ............. *B60C 13/001* (2013.04); *B60C 13/04* (2013.01)

(58) Field of Classification Search
CPC ........ B60C 13/00; B60C 13/001; B60C 13/02; B60C 13/04
See application file for complete search history.

(56) References Cited

U.S. PATENT DOCUMENTS 7,204,284 B2 * 4/2007 Paturle ................ B29C 37/0053
152/523

FOREIGN PATENT DOCUMENTS

| CN | 2546230 Y | 4/2003 |
| CN | 1608869 A | 4/2005 |
| DE | 102010016069 A1 | 9/2011 |
| EP | 2163406 A1 | 3/2010 |

(Continued)

OTHER PUBLICATIONS

Communication dated Aug. 31, 2015, issued by the State Intellectual Property Office of the P.R.C. in corresponding Chinese Application No. 201280049818.1.

(Continued)

*Primary Examiner* — Justin Fischer
(74) *Attorney, Agent, or Firm* — Sughrue Mion, PLLC

(57) ABSTRACT

A tire includes an annular decoration printing portion, at least a portion thereof being provided on an outer surface of a side portion further toward a tire radial direction outer side than a tire maximum width position. The decoration printing portion includes an annular design portion and an annular gradation portion provided at least on the tire radial direction outer side of the design portion. The gradation portion incrementally decreases in value outward in the tire radial direction, with a value of 100% being a pure color and a value of 0% being pure black in an HSV color space.

8 Claims, 5 Drawing Sheets

(56) References Cited

FOREIGN PATENT DOCUMENTS

| | | | |
|---|---|---|---|
| JP | 50-32603 A | | 3/1975 |
| JP | 54-38006 A | | 3/1979 |
| JP | 2000-255223 | * | 9/2000 |
| JP | 2000-255223 A | | 9/2000 |
| JP | 2002-120519 | * | 4/2002 |
| JP | 2002-192624 A | | 7/2002 |
| JP | 2006-224704 | * | 8/2006 |
| JP | 2010-125440 A | | 6/2010 |
| JP | 2010-195236 A | | 9/2010 |
| WO | WO 2009/154008 | * | 12/2009 |

OTHER PUBLICATIONS

Communication dated Jun. 30, 2015 from the European Patent Office in counterpart European Application No. 12842471.0.
International Search Report for PCT/JP2012/077813 dated Jan. 22, 2013.

* cited by examiner

PNEUMATIC TIRE

CROSS REFERENCE TO RELATED APPLICATIONS

This application is a National Stage of International Application No. PCT/JP2012/077813, filed on Oct. 22, 2012, which claims priority from Japanese Patent Application No. 2011-232088, filed on Oct. 21, 2011, the contents of all of which are incorporated herein by reference in their entirety.

TECHNICAL FIELD

The present invention relates to a pneumatic tire (referred to below as a "tire") provided with an annular decoration printing portion on an outer surface of a side portion that includes a sidewall and a bead portion. In particular, a technique is proposed for adding greater value by increasing the tire's decorativeness and for achieving an external appearance sufficiently differentiated from other tires.

BACKGROUND ART

Techniques are known for displaying marks on the outer surface of a side portion that includes a sidewall and a bead portion. The marks are composed of characters, graphics, symbols including barcodes, or the like that indicate a company or brand name, tire size, time of manufacture, or other information. With these techniques, all of the marks have typically been formed by a raised/recessed surface including at least one of a protrusion, a depression, or a ridge.

When marks are thus formed by a raised/recessed surface of the outer surface of the tire side portion, air resistance increases when the tire is rotated with load applied thereon, causing the undeniable problem of a decrease in fuel economy when the vehicle is driven at high speed. Furthermore, the marks are the same color as the ground color of the tire, causing the problem of poor visibility of the marks.

Therefore, a technique has been proposed to print marks on the outer surface of the tire side portion using a printing device such as that disclosed in Patent Literature 1.

In this printing device, a plurality of fixed position upper press rolls, disposed in the circumferential direction of the tire side portion at equivalent angular intervals, press an area between the outside diameter and the printing surface of the tire side portion, and with the tire printing surface being flattened indirectly due to the upper press roles, ink is sprayed from inkjet printer heads while rotating the tire. This printing device can thus print marks of a desired color on the outer surface of the tire side portion. Note that when using this device, it is possible to form not only marks but also decoration by printing on the tire side portion.

CITATION LIST

Patent Literature

PTL 1: JP2010-125440A

SUMMARY OF INVENTION

When thus printing on the outer surface of the tire side portion using a printing device such as the one described above, the value (brightness) of the printed marks or decoration differs greatly from the value of the tire ground color. Therefore, a problem arises in that a viewer strongly perceives the boundary between the area where the marks or decoration are printed and the area without printing and finds the printed area to be incongruous, not blending with the tire side portion (referred to below as a "sense of incongruity").

Furthermore, in the case of unevenness or runny ink during printing, the difference in color becomes prominent at the boundary between the black of the tire ground color and the printing portion, in particular at the outer edge of the printing portion. This leads to the problem that misprinting at the outer edge easily becomes conspicuous.

It is an object of the present invention effectively to solve such conventional problems occurring when printing with a printing device by providing a tire with reduced air resistance when rotated with load applied thereon, greatly increased decorativeness at the outer surface of the tire side portion by printing, and increased yield of printed product tires by reducing the noticeability of misprinting due to unevenness or runny ink.

A tire according to the present invention includes a side portion including a sidewall and a bead portion, the sidewall being continuous along a tire radial direction inner edge of a tread side portion and extending inward in the tire radial direction, and the bead portion being continuous along a tire radial direction inner edge of the sidewall; and an annular decoration printing portion, at least a portion thereof being provided on an outer surface of the side portion further toward a tire radial direction outer side than a tire maximum width position, the decoration printing portion including an annular design portion and an annular gradation portion provided at least on the tire radial direction outer side of the design portion, and the gradation portion incrementally decreasing in value outward in the tire radial direction.

In the context of the present invention, "value" (brightness) is defined by the HSV model, with a value of 100% being the brightest color for each hue (pure color), and a value of 0% being pure black.

Value is measured by first using a spectral colorimeter (for example, produced by Konica Minolta) to measure the value of measurement targets, such as marks, the design portion, the gradation portion, and the like, with a different system (for example, a Lab color space) and then using necessary software (for example, photoshop (registered trademark)) to convert the value to the HSV system.

In the context of the present invention, the "value of an edge of the gradation portion in the tire radial direction" refers to the value in an annular area having a width of 1 mm in the tire radial direction from the tire radial direction boundary of the gradation portion toward the inside of the gradation portion.

Furthermore, in the context of the present invention, measurement of dimensions such as the width of the gradation portion in the tire radial direction is made with the tire being mounted on an applicable rim, and with predetermined internal pressure applied and no load applied.

The "rim line position" refers to the position of a protrusion, continuous in the circumferential direction, provided at a location nearly flush with the rim flange height, with the tire being mounted on an applicable rim, and with predetermined internal pressure applied and no load applied.

In this disclosure, an "applicable rim" refers to a rim prescribed by valid industrial standards for the region in which the tire is produced or used, such as the "JATMA (Japan Automobile Tyre Manufacturers Association) Year Book" in Japan, the "ETRTO (European Tyre and Rim Technical Organisation) Standard Manual" in Europe, and the "TRA (Tire and Rim Association, Inc.) Year Book" in the United States of America.

Furthermore, "predetermined internal pressure" refers to an applied air pressure (maximum air pressure) corresponding to the maximum load capability of the tire as specified in accordance with tire size under the standards of JATMA or the like, and the "maximum load capability" refers to the maximum mass permitted as a load on the tire under the above standards.

Note that the air referred to above may be replaced by nitrogen gas or another inert gas.

In the tire according to the present invention, the annular gradation portion is provided on the outer surface of the tire side portion at least on the tire radial direction outer side of the design portion in the annular decoration printing portion, and in the gradation portion, the value of the printing design is incrementally changed in the tire radial direction. Therefore, decoration can be formed by flat printing, without raising or recessing the outer surface of the side portion, thereby reducing the air resistance when the tire is rotated. Forming the gradation portion also relieves the sense of incongruity felt by the viewer, thus greatly increasing the decorativeness, and reduces the noticeability of misprinting.

BRIEF DESCRIPTION OF DRAWINGS

The present invention will be further described below with reference to the accompanying drawings, wherein.

DESCRIPTION OF EMBODIMENTS

With reference to the drawings, the following describes an embodiment of the present invention.

The following merely provides an example, and the structure and effects of each member are not limited to those described below.

Figure 1:
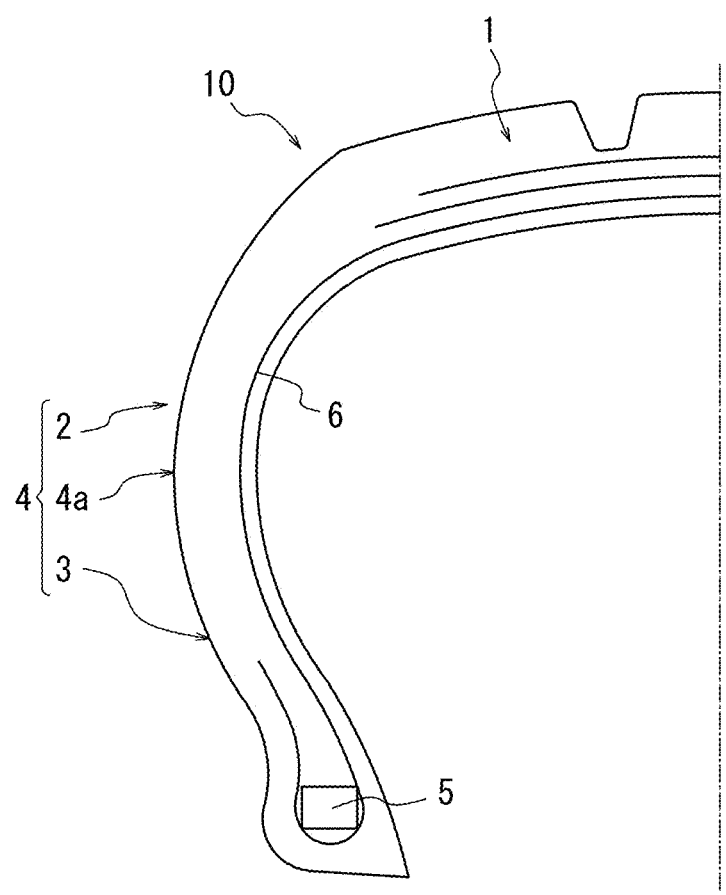
FIG. 1 is a cross-sectional diagram in the width direction showing half of a tire in an embodiment of the present invention, the other half of the tire having the same structure.

A pneumatic tire 10 illustrated in FIG. 1 is provided with a tread portion 1 and a side portion 4, the side portion 4 including sidewalls 2 continuous along the tire radial direction inner edge of the side of the tread portion 1 and extending inward in the tire radial direction, and bead portions 3 continuous along the tire radial direction inner edge of the sidewall 2.

The tire 10 is provided with a carcass ply 6 extending between the pair of bead portions 3. The carcass ply 6 extends toroidally from the tread portion 1 across the pair of sidewalls 2 to the pair of bead portions 3 and is fastened by turning up around a bead core 5 embedded in each bead portion 3.

Figure 2:
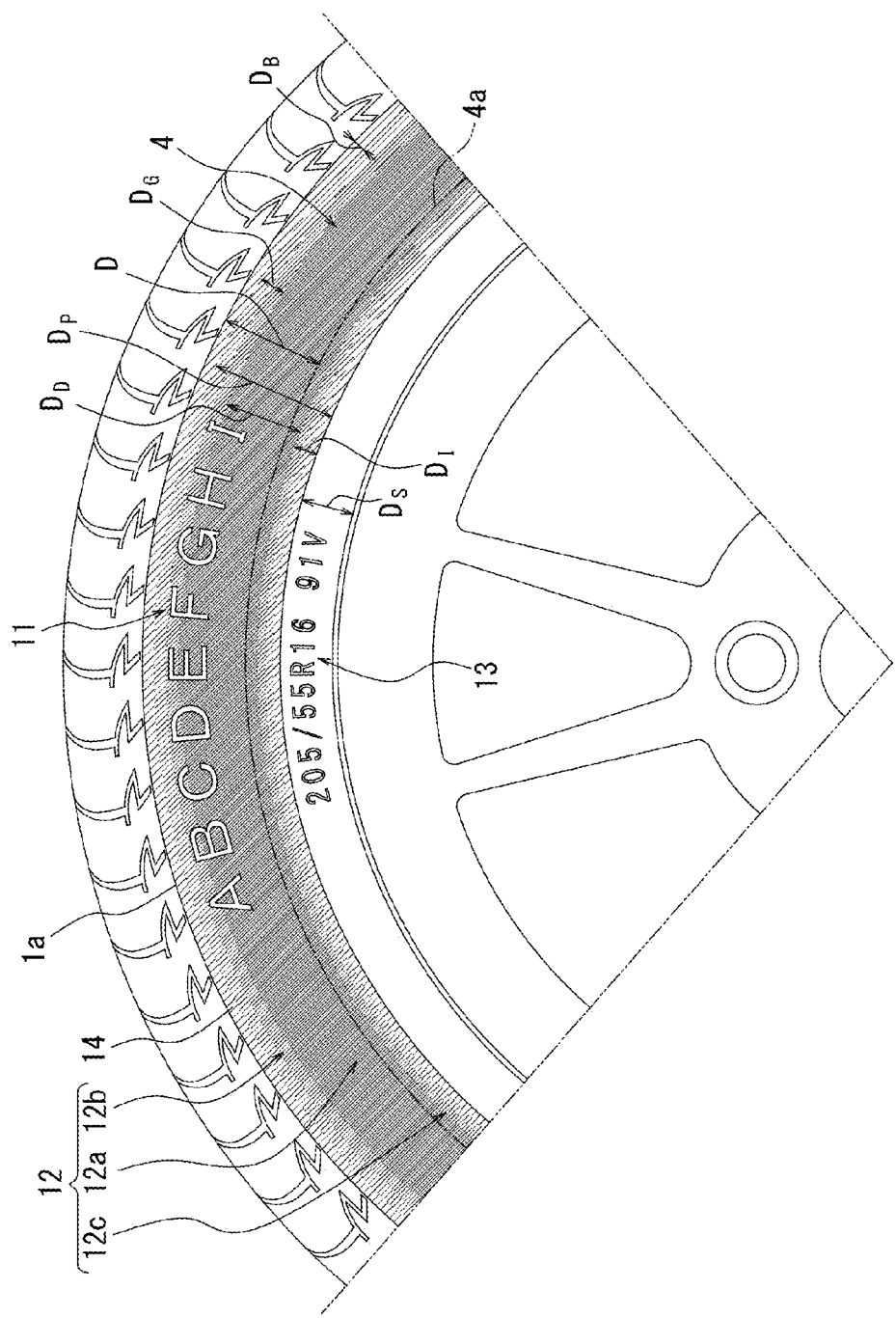
FIG. 2 is a partial side view of the tire in FIG. 1 after mounting on an applicable rim, with predetermined internal pressure and no load applied.

As illustrated in FIG. 2, marks 11 indicating a company name or the like and an annular decoration printing portion 12 are formed by printing on the outer surface of the side portion 4, and an engraving 13 formed by a conventional raised/recessed surface, for example indicating tire size or the like, is applied between the decoration printing portion 12 and the rim line position.

At least a portion of the decoration printing portion 12 is provided on the outer surface of the side portion 4 further toward the tire radial direction outer side than a tire maximum width position 4a. As in the embodiment illustrated in FIGS. 2 and 3, however, from the perspective of applying a sufficient decoration, the decoration printing portion 12 is preferably provided on the outer surface of the side portion 4 starting near a tread edge 1a, extending over the tire maximum width position 4a, and ending at or near the bead portion 3.

From the perspective of decorativeness, the annular decoration printing portion 12 is preferably perfectly annular, i.e. forming a continuous loop in the tire circumferential direction, yet the annular decoration printing portion 12 may also be formed intermittently or at only a portion of the circumference. The same is true for the below-described annular design portion 12a, annular gradation portions 12b and 12c, annular black portion 14, and the like.

Forming the marks 11 and decoration printing portion 12 by printing to be a desired value (brightness) improves visibility, and since the printed portion is a flat surface, air resistance during driving is lowered, thus improving fuel economy. Furthermore, cracks in the rubber surface of the side portion occur less easily, thereby improving durability.

On the other hand, by applying the engraving 13 formed by a raised/recessed surface to the inner circumferential area of the decoration printing portion 12, unintended wear due to abrasion or the like can be effectively prevented.

Note that the area in which the engraving 13 is applied has a small rotation radius and a small circumferential speed, and therefore the effect of the engraving on air resistance is relatively small.

Figure 3:
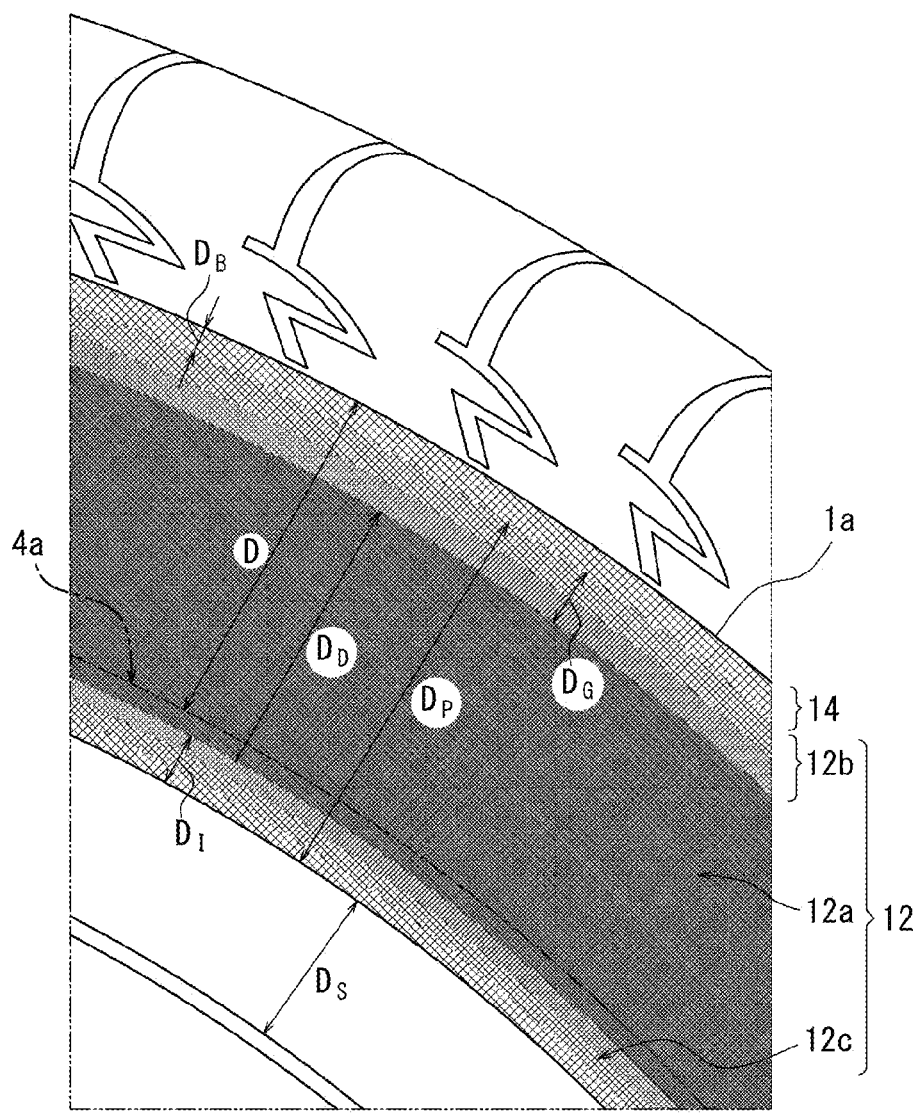
FIG. 3 is a partial enlarged side view of a decoration printing portion of the tire in FIG. 2.

As is clear from FIG. 3, the decoration printing portion 12 is provided with a design portion 12a and a gradation portion 12b disposed on the tire radial direction outer side of the design portion 12a.

Figure 4:
FIG. 4 illustrates decoration formed on the side of the tire in FIG. 2.

In the present embodiment, an annular design, in which the center of a satellite photograph of the earth is cut out, having a fixed width in the radial direction is formed in the design portion 12a, as illustrated in FIG. 4. Portions showing clouds are printed white, and portions showing the sea are printed blue. While not clearly shown in the figures, printing applied to the gradation portion 12b incrementally decreases in value from the design portion 12a towards the outer circumference in the tire radial direction, changing in color from white or blue to black. In the gradation portion 12b and the below-described inner gradation portion 12c in FIGS. 1 to 3 and 5, portions with thick hatching have a high value, and portions with thin hatching have a low value.

In the gradation portion 12b, the value may be changed in any way. For example, the value may be decreased linearly towards the outside in the tire radial direction.

Thus providing the gradation portion 12b on the side portion 4 in the vicinity of the tread edge 1a relieves the sense of incongruity felt by a viewer when printing is applied near the tread edge 1a with a conventional technique, thereby increasing the decorativeness of the tire and reducing the noticeability of misprinting.

Furthermore, by decreasing the value in the gradation portion 12b towards the outer circumference in the tire radial direction, the value of the decoration printing portion 12 approaches the value of the tread portion 1, which for example has a value of 10%, with increasing proximity to the tread edge 1a. Therefore, no large difference in value occurs between the decoration printing portion 12 and the tread edge 1a, thereby reducing the user's sense of incongruity. Moreover, by having the value in the largest area within the side portion 4, i.e. the vicinity of the tread edge 1a, approach the value of the tread portion itself results in a value even closer to the tire ground value. As a result, the amount of ink needed for printing can be reduced, and manufacturing costs can be greatly lowered. A thinner application of ink can also eliminate the risk of cracks in the printing layer.

When a satellite photograph of the earth is formed in the design portion 12a, the gradation portion 12b looks like the stratosphere, thus reducing the sense of incongruity when a user views the tire side portion.

Also when a satellite photograph of the earth is not formed on the design portion 12a, similar effects can of course be achieved by selecting subject matter for the design portion 12a that yields no sense of incongruity despite the design portion 12a turning black toward the edge, and other designs may also be printed in the design portion 12a.

Furthermore, as illustrated in FIG. 3, when a width $D_G$ of the gradation portion 12b in the tire radial direction is at least 3 mm, and preferably at least 5 mm, and the value of the gradation portion 12b decreases linearly outward in the tire radial direction, then the decoration printing portion 12 appears more natural since the value changes gradually due to the gradation portion 12b. Furthermore, the width of the design portion 12a in the tire radial direction can be guaranteed, thereby further reducing the sense of incongruity felt by the viewer and further increasing the decorativeness. By guaranteeing a certain width for the gradation portion 12b, the noticeability of unevenness or runny ink occurring during printing can be reduced even more at the outer edge of the decoration printing portion 12. When the width $D_G$ of the gradation portion 12b in the tire radial direction is too large, the width of the design portion 12a in the tire radial direction narrows, thus decreasing the decorativeness. Therefore, a limit of 10 mm is preferably placed on the width $D_G$ of the gradation portion 12b in the tire radial direction.

A raised/recessed special shape is often provided on the side portion 4 in the vicinity of the tread edge 1a. Also, when printing on the side portion 4 in the vicinity of the tread edge 1a, decorativeness may be reduced due to abrasion or defacement from rubbing against a curb or the like.

Therefore, an annular black portion 14, having a width $D_B$ in the tire radial direction of at least 3 mm and at most 5 mm, is preferably provided in the decoration printing portion 12 between the tread edge 1a and the gradation portion 12b, adjacent to the tire radial direction inner side of the tread edge 1a. The value of the black portion 14 is preferably 20% or less, for example 10%. In this case, substantially no decoration is provided on the side portion 4 in the vicinity of the tread edge 1a, with substantial decoration being provided further towards a tire radial direction inner side than the vicinity of the side ring. Therefore, even if a raised/recessed special shape is formed on the side portion 4 in the vicinity of the tread, misprinting or the like can be sufficiently hidden by the black portion 14, the effect of abrasion or defacement from a curb or the like can be reduced, and decorativeness can be guaranteed by guaranteeing sufficient width of the decoration printing portion 12 in the tire radial direction.

As an example of forming the side portion 4 in the vicinity of the tread to be a special shape, the vicinity of the side ring may be provided with curvature in order to prevent the occurrence of an air reservoir between the tread ring and the side ring in the mold during the vulcanization process.

When the width of the black portion 14 in the tire radial direction is too great, the width of the decoration printing portion 12 in the tire radial direction narrows, thus reducing the decorativeness. Therefore, the width of the black portion 14 in the tire radial direction is preferably 5 mm or less.

In other words, if the width $D_B$ of the black portion 14 in the tire radial direction is less than 3 mm, then when forming a raised/recessed special shape on the side portion 4 in the vicinity of the tread edge 1a, misprinting cannot be sufficiently hidden, and the tire is more easily affected by abrasion or defacement due to a curb or the like.

Furthermore, if the width $D_B$ of the black portion 14 in the tire radial direction is greater than 5 mm, the width of the decoration printing portion 12 in the tire radial direction decreases, thus preventing the achievement of sufficient decorativeness.

When no printing is applied to the black portion 14, the black portion 14 may be left the same color as the tire ground color. In this case, the amount of ink required for printing can be reduced, thereby further lowering manufacturing costs. A thinner application of ink can also more effectively prevent the occurrence of cracks in the printing layer.

On the other hand, the black portion 14 may be formed by applying printing to the black portion 14 so that the value of the black portion 14 is equivalent to the value of the tread edge 1a or the value at the edge of the design portion 12b on the tire radial direction outer side.

By thus providing the black portion 14, the value of the decoration printing portion 12 in the vicinity of the tread edge 1a can be brought even closer to the tire ground value, and the amount of ink required for printing can be reduced, thereby further lowering manufacturing costs. A thinner application of ink can also more effectively prevent the occurrence of cracks in the printing layer.

When the expression $Dp \geq D$ holds, where Dp is the width of the decoration printing portion 12 in the tire radial direction, and D is the width in the tire radial direction between the tread edge 1a and the tire maximum width position 4a, as illustrated in FIG. 3, then the decoration printing portion is formed over a circular uneven portion. This uneven portion occurs in the tire side portion, due to the existence of the turn-up end of a carcass ply, within a range from the tread edge to the tire maximum width position. Therefore, this uneven portion is made less noticeable, enhancing the decorativeness and reducing the sense of incongruity that a viewer feels due to the uneven section when viewing the side portion. The tire user's uneasiness is thus dispelled and the tire is made more attractive, with an improved quality of appearance.

When the difference in value between edges of the gradation portion 12b in the tire radial direction is in a range of at least 30% and less than 50%, the color of the design portion is highlighted while relieving the sense of incongruity that the viewer feels and enhancing the decorativeness with the decoration printing portion.

On the other hand, when the difference in value of the gradation portion 12b is 50% or more, then by forming a design with a high value in the design portion 12a and increasing the difference in value between the tread portion 1 and the design portion 12a, the design portion 12a can be made to appear even brighter. Furthermore, the decoration appears more natural by incrementally decreasing the value from an area at the tire radial direction outer side of the design portion 12a with a high value towards the low value black portion 14 or the tread edge 1a, located further on the tire radial direction outer side, thus further enhancing the decorativeness. Misaligned or blurry printing on the side portion 4 in the vicinity of the tread edge 1a also becomes less noticeable, so that decorativeness is even further enhanced.

When the value of at least the outer edge of the gradation portion 12b in the tire radial direction is 20% or less, the value of the printed decoration further approaches the value of the tread edge 1a itself with increasing proximity to the tread edge 1a. Therefore, the sense of incongruity felt by the user or the like can be further reduced and the decorativeness further enhanced. Furthermore, since the value of at least the outer edge in the tire radial direction is brought even closer to the tire ground value, the amount of ink required for printing can be even further reduced, further lowering manufacturing costs. The application of ink can also be made thinner, thereby preventing the occurrence of cracks in the printing layer. The noticeability of unevenness or runny ink occurring during printing can also be reduced even more at the outer edge of the gradation portion, and misprinting can be made even less noticeable.

Figure 5:
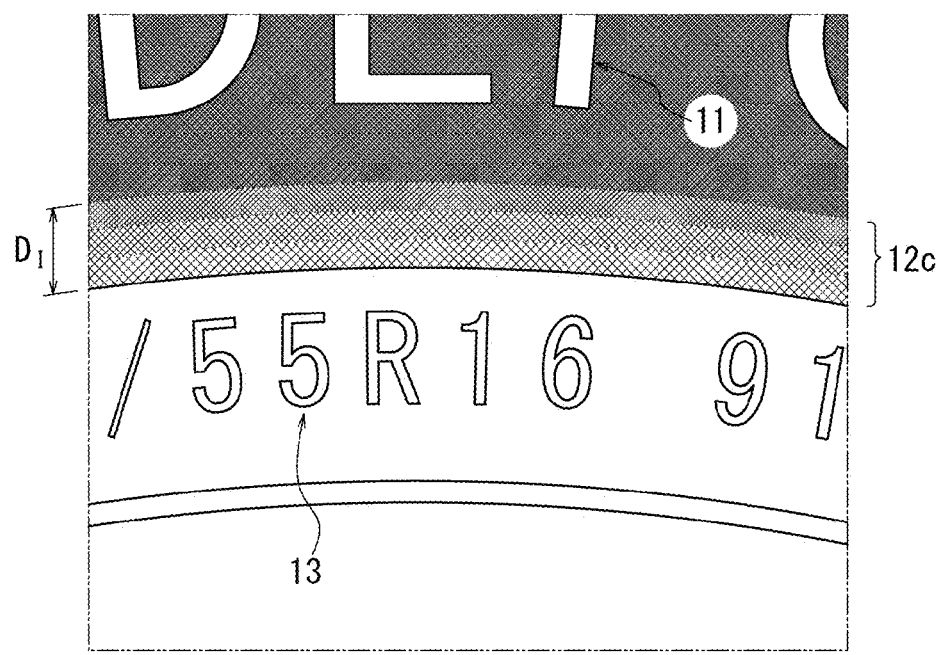
FIG. 5 is a partial enlarged side view of the tire in FIG. 2 from the decoration portion to the rim.

In the illustrated embodiment, an additional gradation portion 12c may be provided on the tire radial direction inner side of the design portion 12a. As illustrated in FIG. 5, in this gradation portion 12c, the width $D_I$ of the gradation portion 12c in the tire radial direction is at least 3 mm, preferably at least 5 mm, and while not clear from FIG. 5, the value incrementally decreases towards the inner circumference in the tire radial direction. In this case, the gradation portion 12c appears to be set back from the design portion 12a, making it appear as though a wide tire were mounted. Therefore, a user desiring a wide tire is satisfied, and when forming decoration by printing, the sense of incongruity felt by a viewer with regard to the vicinity of the rim 21 is relieved. Decorativeness can thus be enhanced, and the occurrence of misprinting can be even further reduced.

If the width $D_I$ of the gradation portion 12c in the tire radial direction is too large, the width of the design portion 12a or the gradation portion 12c in the tire radial direction narrows, decreasing the decorativeness. Hence, the width $D_I$ of the gradation portion 12c in the tire radial direction is preferably 10 mm or less.

Note that the difference in value between edges of the gradation portion 12c in the tire radial direction may be 30% or more, and the value of at least the inner edge in the tire radial direction may be 20% or less. In these cases, decorativeness can be further enhanced.

Furthermore, when an interval Ds measuring, in the tire radial direction, at least 15 mm and at most 50% of the width Dp of the decoration printing portion 12 in the tire radial direction is provided between the decoration printing portion 12 and the rim line position, as illustrated in FIG. 2, then the width of the design portion in the tire radial direction can be guaranteed, so as to guarantee decorativeness, while removing decoration from the vicinity of the rim line, where the engraving 13 of a serial number or the like required by law is provided. The visibility of the serial number or the like can thus be increased.

In other words, if the interval Ds is more than 50% of the width Dp, the roughly black tire ground color at the tire radial direction inner side of the side portion 4 becomes noticeable, and the width of the design portion 11a in the tire radial direction is reduced, so that decorativeness cannot be sufficiently enhanced.

Note that in the above-described embodiment, the structure of the present invention is adopted on both tire sides, yet the structure of the present invention may be adopted on only one half side of the tire, in particular the outer side when vehicle mounted.

EXAMPLE 1

As described below, the sense of incongruity felt by a viewer was investigated for Example Tires 1 to 26 according to the present invention and a Comparative Tire that were produced to have design portions formed thereon. Specifically, 50 viewers observed the produced tires and answered a questionnaire regarding whether they felt a sense of incongruity. For each tire, the number of viewers not feeling a sense of incongruity was totaled. Table 1 shows the results. Using the investigation results for the Comparative Tire as a control, the investigation results for each tire are indicated as an index. A greater value (decorativeness) for the sense of incongruity indicates less of a sense of incongruity for the tire and better decorativeness.

For the Example Tires 1 to 26, the size was 195/65R15, and on the tire side portion, which had a width of 75 mm in the tire radial direction, an interval of 15 mm in the tire radial direction was provided from the rim line position, and an inner gradation portion, design portion, gradation portion, and black portion, respectively having widths of $D_I$, $D_D$, $D_G$, and $D_B$ in the tire radial direction, were provided adjacently in this order towards the tire radial direction outer side. The width D in the tire radial direction between the tread edge and the tire maximum width position was 35 mm.

A decoration in which the center of a satellite photograph of the earth is cut out was formed in the decoration printing portion, as illustrated in FIG. 4. The value of the tire ground color at the side portion and the tread portion and the value of the black portion were 10%, and the value of the gradation portion and the inner gradation portion (when present) was changed linearly in the tire radial direction so that the difference in value between edges the tire radial direction was ΔV (%).

On the other hand, in the Comparative Tire, the gradation portion, inner gradation portion, and black portion were not provided in the side portion. Instead, a design portion, bearing a decoration in which the center of a satellite photograph of the earth is cut out, was formed over the entire surface except for an area with a width of 15 mm in the tire radial direction from the rim line position. Otherwise, the Comparative Tire was similar to the Example Tires 1 to 26.

TABLE 1

|  | Example Tire 1 | Example Tire 2 | Example Tire 3 | Example Tire 4 | Example Tire 5 | Example Tire 6 | Example Tire 7 |
| --- | --- | --- | --- | --- | --- | --- | --- |
| $D_I$ (mm) | — | — | — | — | — | — | — |
| $D_D$ (mm) | 53 | 52 | 51 | 50 | 48 | 45 | 43 |
| $D_G$ (mm) | 2 | 3 | 4 | 5 | 7 | 10 | 12 |
| $D_B$ (mm) | 5 | 5 | 5 | 5 | 5 | 5 | 5 |

TABLE 1-continued

|  | | | | | | | |
|---|---|---|---|---|---|---|---|
| ΔV (%) | 40 | 40 | 40 | 40 | 40 | 40 | 40 |
| Decorativeness | 105 | 130 | 132 | 135 | 125 | 120 | 110 |

|  | Example Tire 8 | Example Tire 9 | Example Tire 10 | Example Tire 11 | Example Tire 12 | Example Tire 13 | Example Tire 14 |
|---|---|---|---|---|---|---|---|
| $D_I$ (mm) | — | — | — | — | — | — | — |
| $D_D$ (mm) | 57 | 55 | 54 | 53 | 52 | 51 | 52 |
| $D_G$ (mm) | 3 | 3 | 3 | 3 | 3 | 3 | 3 |
| $D_B$ (mm) | — | 2 | 3 | 4 | 5 | 6 | 5 |
| ΔV (%) | 40 | 40 | 40 | 40 | 40 | 40 | 20 |
| Decorativeness | 110 | 115 | 125 | 135 | 125 | 115 | 105 |

|  | Example Tire 15 | Example Tire 16 | Example Tire 17 | Example Tire 18 | Example Tire 19 | Example Tire 20 | Example Tire 21 |
|---|---|---|---|---|---|---|---|
| $D_I$ (mm) | — | — | — | — | — | 2 | 3 |
| $D_D$ (mm) | 52 | 52 | 52 | 52 | 52 | 48 | 47 |
| $D_G$ (mm) | 3 | 3 | 3 | 3 | 3 | 5 | 5 |
| $D_B$ (mm) | 5 | 5 | 5 | 5 | 5 | 5 | 5 |
| ΔV (%) | 30 | 35 | 45 | 50 | 60 | 40 | 40 |
| Decorativeness | 120 | 125 | 130 | 125 | 130 | 135 | 140 |

|  | Example Tire 22 | Example Tire 23 | Example Tire 24 | Example Tire 25 | Example Tire 26 | Comparative Tire |
|---|---|---|---|---|---|---|
| $D_I$ (mm) | 4 | 5 | 7 | 10 | 12 | — |
| $D_D$ (mm) | 46 | 45 | 43 | 40 | 38 | 60 |
| $D_G$ (mm) | 5 | 5 | 5 | 5 | 5 | — |
| $D_B$ (mm) | 5 | 5 | 5 | 5 | 5 | — |
| ΔV (%) | 40 | 40 | 40 | 40 | 40 | — |
| Decorativeness | 140 | 145 | 125 | 120 | 110 | 100 |

The results indicate that the user felt a lesser sense of incongruity with respect to the Example Tires, in which the gradation portion was provided in the side portion, than the Comparative Tire. Hence, the Example Tires had enhanced decorativeness. In particular, when $D_G$ was 5 mm or more, the sense of incongruity was clearly reduced greatly. Providing the black portion and the inner gradation portion also clearly reduced the sense of incongruity even further.

Furthermore, setting the difference in value of the gradation portion in the radial direction to be 50% or more clearly achieved a greater reduction in the sense of incongruity.

EXAMPLE 2

As described below, 50 each of Example Tires 1 and 20 according to the present invention and the Comparative Tire were produced, and the number of tires for which misprinting was discovered due to unevenness or runny ink was investigated. Table 2 shows the results. The Example Tires 1 and 20 and Comparative Tire produced here were the same as the Example Tires 1 and 20 and Comparative Tire of Example 1. In other words, in Example Tire 1, the gradation portion was formed only on the outer side of the decoration portion in the tire radial direction, and in Example Tire 20, the gradation portion was formed on the outer and inner sides in the tire radial direction. In the Comparative Tire, no gradation portion was formed.

TABLE 2

|  | Example Tire 1 | Example Tire 20 | Comparative Tire |
|---|---|---|---|
| Outer side gradation | YES | YES | NO |
| Inner side gradation | NO | YES | NO |
| Number of misprints | 1 | 0 | 3 |

The results indicate that for Example Tires 1, and 20, provided with the gradation portion on the tire radial direction outer side, the number of tires with misprinting was reduced with respect to the Comparative Tire. Also, providing the gradation portion on the tire radial direction inner side as well clearly further reduced the number of tires with misprinting.

REFERENCE SIGNS LIST

1: Tread portion
   1a: Tread edge (tire radial direction inner edge of a tread side portion)
2: Sidewall
3: Bead portion
4: Side portion
   4a: Tire maximum width position
5: Bead core
6: Carcass ply
10: Tire
11: Mark
12: Decoration printing portion
   12a: Design portion
   12b: Gradation portion
   12c: Inner gradation portion 13: Engraving
14: Black portion
D: Width in tire radial direction between tread edge and tire maximum width position
$D_B$: Width of black portion gradation portion in tire radial direction
$D_D$: Width of design portion in tire radial direction
$D_G$: Width of gradation portion in tire radial direction
$D_I$: Width of inner gradation portion in tire radial direction
$D_P$: Width of decoration printing portion in tire radial direction
$D_S$: Engraving portion in vicinity of rim line

The invention claimed is:

1. A pneumatic tire comprising:
a side portion including a sidewall and a bead portion, the sidewall being continuous along a tire radial direction inner edge of a tread side portion and extending inward in the tire radial direction, and the bead portion being continuous along a tire radial direction inner edge of the sidewall; and
an annular decoration printing portion, at least a portion thereof being provided on an outer surface of the side portion further toward a tire radial direction outer side than a tire maximum width position,
the decoration printing portion including an annular design portion and an annular gradation portion provided at least on the tire radial direction outer side of the design portion, and
the gradation portion incrementally decreasing in value outward in the tire radial direction, with a value of 100% being a pure color and a value of 0% being pure black in an HSV color space, and
a width of the gradation portion in the tire radial direction being at least 3 mm and at most 10 mm, and the gradation portion incrementally decreasing in value outward in the tire radial direction.

2. The pneumatic tire according to claim 1, satisfying the expression Dp≥D, where Dp is a width of the decoration printing portion in the tire radial direction, and D is a width in the tire radial direction between the tire radial direction inner edge of the tread side portion and the tire maximum width position.

3. The pneumatic tire according to claim 1, a difference in value between edges of the gradation portion in the tire radial direction being at least 30% and less than 50%.

4. The pneumatic tire according to claim 1, a difference in value between edges of the gradation portion in the tire radial direction being 50% or more.

5. The pneumatic tire according to claim 1, a value of at least an outer edge of the gradation portion in the tire radial direction being 20% or less.

6. The pneumatic tire according to claim 1, an interval measuring, in the tire radial direction, at least 15 mm and at most 50% of width Dp of the decoration printing portion in the tire radial direction being provided between the decoration printing portion and a rim line position.

7. A pneumatic tire comprising:
a side portion including a sidewall and a bead portion, the sidewall being continuous along a tire radial direction inner edge of a tread side portion and extending inward in the tire radial direction, and the bead portion being continuous along a tire radial direction inner edge of the sidewall; and
an annular decoration printing portion, at least a portion thereof being provided on an outer surface of the side portion further toward a tire radial direction outer side than a tire maximum width position,
the decoration printing portion including an annular design portion and an annular gradation portion provided at least on the tire radial direction outer side of the design portion, and
the gradation portion incrementally decreasing in value outward in the tire radial direction, with a value of 100% being a pure color and a value of 0% being pure black in an HSV color space,
the pneumatic tire further comprising:
an annular black portion, having a width in the tire radial direction of at least 3 mm and at most 5 mm, on the outer surface of the side portion, positioned between the tread side portion and the gradation portion, adjacent to a tire radial direction inner side of the tire radial direction inner edge of the tread side portion,
a value of the black portion being 20% or less.

8. A pneumatic tire comprising:
a side portion including a sidewall and a bead portion, the sidewall being continuous along a tire radial direction inner edge of a tread side portion and extending inward in the tire radial direction, and the bead portion being continuous along a tire radial direction inner edge of the sidewall; and
an annular decoration printing portion, at least a portion thereof being provided on an outer surface of the side portion further toward a tire radial direction outer side than a tire maximum width position,
the decoration printing portion including an annular design portion and an annular gradation portion provided at least on the tire radial direction outer side of the design portion,
the gradation portion incrementally decreasing in value outward in the tire radial direction, with a value of 100% being a pure color and a value of 0% being pure black in an HSV color space,
the decoration printing portion including an additional gradation portion on a tire radial direction inner side of the design portion, and
a width of the additional gradation portion in the tire radial direction being at least 3 mm and at most 10 mm, and the additional gradation portion incrementally decreasing in value inward in the tire radial direction.

* * * * *